(12) United States Patent
Hashimoto (10) Patent No.: US 6,249,616 B1
(45) Date of Patent: *Jun. 19, 2001

(54) COMBINING DIGITAL IMAGES BASED ON THREE-DIMENSIONAL RELATIONSHIPS BETWEEN SOURCE IMAGE DATA SETS

(75) Inventor: Roy T. Hashimoto, Redwood, CA (US)

(73) Assignee: Enroute, INC, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,840

(22) Filed: May 30, 1997

(51) Int. Cl.[7] .................................................. G06K 9/36
(52) U.S. Cl. ...................... 382/284; 382/154; 382/294; 345/427; 348/39
(58) Field of Search ................................. 382/284–286, 382/294, 154, 276, 131–133, 115–119, 139, 421, 425–427, 435–437; 358/450, 540, 453; 345/115–120, 440, 427–435; 348/36–44, 47–50, 584–601; 378/22, 23

(56) References Cited

U.S. PATENT DOCUMENTS

| 4,598,369 | * | 7/1986 | Wang et al. ........................ 378/22 |
| 4,673,988 | | 6/1987 | Jansson et al. .................... 358/453 |
| 4,797,942 | | 1/1989 | Burt et al. ........................ 382/284 |
| 5,187,754 | | 2/1993 | Currin et al. ..................... 382/284 |
| 5,444,478 | | 8/1995 | LeLong et al. .................... 348/39 |
| 5,531,520 | * | 7/1996 | Grimson et al. ................... 382/131 |
| 5,586,231 | | 12/1996 | Florent et al. .................... 345/425 |
| 5,611,000 | * | 3/1997 | Szeliski et al. ................... 382/294 |
| 5,613,013 | * | 3/1997 | Schuette .......................... 382/124 |
| 5,629,988 | | 5/1997 | Burt et al. ........................ 382/276 |
| 5,649,032 | | 7/1997 | Burt et al. ........................ 382/284 |
| 5,650,814 | | 7/1997 | Florent et al. .................... 348/39 |
| 5,684,890 | * | 11/1997 | Miyashita et al. ................. 382/154 |
| 5,699,444 | * | 12/1997 | Palm .............................. 382/106 |
| 5,706,416 | * | 1/1998 | Mann et al. ...................... 345/427 |
| 5,757,321 | * | 5/1998 | Billyard .......................... 345/434 |
| 5,825,369 | * | 10/1998 | Rossignac et al. ................. 345/440 |
| 5,881,163 | * | 3/1999 | Slump et al. ..................... 382/132 |

FOREIGN PATENT DOCUMENTS

| 0 563 737 A1 | * | 3/1993 | (EP) | ............................. H04N/13/02 |
| WO 98 12504 | | 3/1998 | (WO) | ............................. G01C/11/02 |

OTHER PUBLICATIONS

Lipari et al., Geometric Modeling and Recognition of elongated Regions in Arial Images, IEEE vol. 19 No. 6, pp. 1600–1612, Dec. 1989.*

R. I. Hartley, "Projective Reconstruction and Invariants from Multiple Images", IEEE Transactions on Pattern Analysis and Machine Intelligence, vol. 16, No. 10, Oct. 1, 1994, pp. 1036–1041.

P.J. Burt and E.H. Adelson, A Multiresolution Spline with Application to Image Mosaics, ACM Transactions on Graphics, pp. 217–36 (Oct. 1983).

Mann and Picard, Video Orbits of the Projective Group: A New Perspective on Image Mosaicing, MIT Media Lab Tech Report No. 338 (1995).

(List continued on next page.)

Primary Examiner—Leo Boudreau
Assistant Examiner—Ishrat Sherali
(74) Attorney, Agent, or Firm—Fish & Richardson P.C.

(57) ABSTRACT

A computer-implemented method combines related source images, each represented by a set of digital data, by determining three-dimensional relationships between data sets representing related source images and creating a data set representing an output image by combining the data sets representing the source images in accordance with the determined three-dimensional relationships.

23 Claims, 6 Drawing Sheets

OTHER PUBLICATIONS

Mann, Compositing Multiple Pictures of the Same Scene: Generalized Large–Displacement 8–Parameter Motion, Proceedings of the 46th Annual IS&T Conference, Cambridge, Massachusetts (May 9–14, 1993).

Brown, A Survey of Image Registration Techniques, ACM Computing Surveys (1992).

D.J. Burr, A Dynamic Model for Image Registration, Computer Graphics and Image Processing (1981).

F. Bartolini et al., A Noise Resistant Optical Flow Algorithm, Proceedings of 7th Intl. Conference on Image Analysis & Processing (Sep. 20–22, 1993).

P. Haeberli and E. Ofek, Automatic Panoramic Image Merging, http://www.sgi.com/grafica/mergeindex.html (1997).

P. Haeberli and E. Ofek, "align.c" source code (1993).

Bergen et al., Hierarchical Model–Based Motion Estimation, ECCV '92, 2nd European Conference on Computer Vision (May 1992).

R.M. Hord, Digital Image Processing of Remotely Sensed Data, Academic Press (May 1982).

Irani and Peleg, Improving Resolution by Image Registration, CVGIP: Graphical Models and Image Processing (1991).

R. Szeliski, Image Mosaicing for Tele–Reality Applications, Digital Equipment Corporation, Cambridge Research Lab (May 1994).

R. Szeliski, Spline–Based Image Registration, Digital Equipment Corporation, Cambridge Research Lab (Apr. 1994).

Chen, QuickTime VR—An Image–Based Approach to Virtual Environment Navigation, Computer Graphics Proceedings, Annual Conference Series (1995).

Green and Heckbert, Creating Raster Omnimax Images from Multiple Perspective Views Using the Elliptical Weighted Average Filter, New York Institute of Technology (1986).

Mann and Picard, Virtual Bellows: Constructing High Quality Stills from Video, MIT Media Laboratory Tech Report No. 259 (Nov. 1994).

L. Teodosio and W. Bender, Salient Video Stills: Content and Context Preserved, ACM Multimedia Conference Proceedings, Anaheim (Aug. 1993).

Mann, S. and R.W. Picard, "Video Orbits of the Projective Group: A New Perspective on Image Mosaicing", MIT Media Laboratory Perceptual Computing Section Technical Report No. 338, pp. 1–17.

Szeliski, Richard, "Image Mosaicing for Tele–Reality Applications", Cambridge Research Laboratory Technical Report Series, May 1994, pp. 1–30.

Haeberli, Paul and Eyal Ofek, "Automatic Panoramic Image Merging", 2 pages, (http://www.sgi.com/grafica/merge/index.html).

Dana, Peter H. "Map Projection Overview", pp. 1–8, (http://www.utexas.edu/depts/grg/gcraft/notes/mapproj/mapproj.html).

Tong, Xin and Krishna Nayak, "Image Registration Using Phase Correlation", EE 262 Project Report, 3 pages, (http://www–LeLand.stanford.edu/~xin/ee262/report/report.html).

* cited by examiner

COMBINING DIGITAL IMAGES BASED ON THREE-DIMENSIONAL RELATIONSHIPS BETWEEN SOURCE IMAGE DATA SETS

BACKGROUND

The present invention relates to combining digital images.

Digital images typically comprise two-dimensional arrays of picture elements (pixels) and may be, for example, digitized photographs or computer-generated images. Many applications exist for combining digital images, including applications for determining camera motion between video frames to stabilize video images, for relating or recognizing the content of different images, for aligning images for mosaicing, for high-resolution enhancement, and for building detailed models for virtual reality applications. Further discussion of various applications are found in articles such as S. Mann & R. W. Picard, Video Orbits of the Projective Group: A New Perspective on Image Mosaicing, M.I.T. Media Laboratory Perceptual Computing Section Technical Report No. 338 (1995) and Richard Szeliski, Image Mosaicing for Tele-Reality Applications, Cambridge Research Laboratory Technical Report Series (CRL 94/2) (1994), both of which are incorporated by reference.

Combining images typically requires "registering" pairs of images, which matches two or more images containing overlapping scenes and describes the correspondence of one to another. The correspondence enables the images to be combined by mapping the image data into a common image space using any of a variety of transforms, such as affine and projective transforms. As described in the Mann & Picard article, affine methods are simpler and are acceptable approximations when the correspondence between pictures is high or the images have a small field of view, or the content of the image is planar. Projective transform methods are more complex but can produce results that are mathematically more accurate for images acquired from a fixed camera location. Existing projective transform methods typically register a first image with a second by determining transform parameters corresponding to a two-dimensional projective transformation:

$$[w'u' \quad w'v' \quad w'] = [u \quad v \quad 1] \begin{bmatrix} m_0 & m_1 & m_2 \\ m_3 & m_4 & m_5 \\ m_6 & m_7 & 1 \end{bmatrix} \quad \text{Equation 1}$$

where (u,v) are the coordinates in an image space of a pixel of the first image and (u', v') are the coordinates of the pixel mapped into an image space of the second image. This transform has eight parameters, or degrees of freedom ($m_0$, ..., $m_7$). Solving for the eight degrees of freedom typically requires a non-linear approach, which can be computationally expensive and is not guaranteed to produce a correct result.

SUMMARY

In general, in one aspect, the invention features a computer-implemented method for combining related source images, each represented by a set of digital data, by determining three-dimensional relationships between data sets representing related source images and creating a data set representing an output image by combining the data sets representing the source images in accordance with the determined three-dimensional relationships.

Certain implementations of the invention include one or more of the following features. Each of the source images and the output image may have a corresponding image space. Determining three-dimensional relationships between source images further may include determining three-dimensional transformations between the source image spaces. The output image space may be the image space of a source image. Determining a three-dimensional transformation between one source image space and another image space further may include determining parameters describing the three-dimensional transformation. The parameters may describe a camera orientation, a distance between the camera and the source image, and a distance between the camera and the target image.

In general, in another aspect, the invention features a memory device storing computer readable instructions for aiding a computer to perform the above method.

In general, in another aspect, the invention features an apparatus to combine related source images, each represented by a set of digital data, comprising a storage medium to store related source images, each represented by a set of digital data, and a processor operatively coupled to the storage medium and configured to perform the above method.

Among the advantages of the invention are the following. The invention may be used to create composite images with wide fields of view, to create fully surrounding environments, and to enhance resolution. Further, source images may be merged without identification of specific corresponding features.

The invention determines projective transform parameters for a three-dimensional projective mapping, requiring solving for only five variables (degrees of freedom) rather than the eight required for two-dimensional projective mappings. The invention produces a solution that is always physically realizable, and because the dimensionality of the problem is reduced, a solution may be obtained more quickly. Further, because the parameters may be chosen to be directly related to how the images are acquired, solving for the parameters is readily simplified by further reducing the number of degrees of freedom if there are known constraints on the image acquisition, such as using a single focal length lens for multiple images or restricting motion (such as if the images are all acquired using a camera mounted on a tripod and allowing only panning).

Other advantages and features of the invention will become apparent from the following description and from the claims.

DETAILED DESCRIPTION

Represented in three dimensions, a digital image has corresponding camera parameters that describe a position of a camera relative to a scene such that the scene is viewed from the camera as it appears in the image. Each image further has a local image space defining a coordinate space in which the points in the image scene may be identified. The relationship between two images containing overlapping scenes can be described by a three-dimensional transformation, which describes the required reorienting of the camera from a first orientation, from which the scene is viewed as shown in the first image, to a second orientation, from which the scene is viewed as shown in the second image. An alternative description of the transformation is that it maps a point in the first image space to a point in the second image space, where both the original and mapped points correspond to the same point in the scene.

1. Image Acquisition

Figure 1:
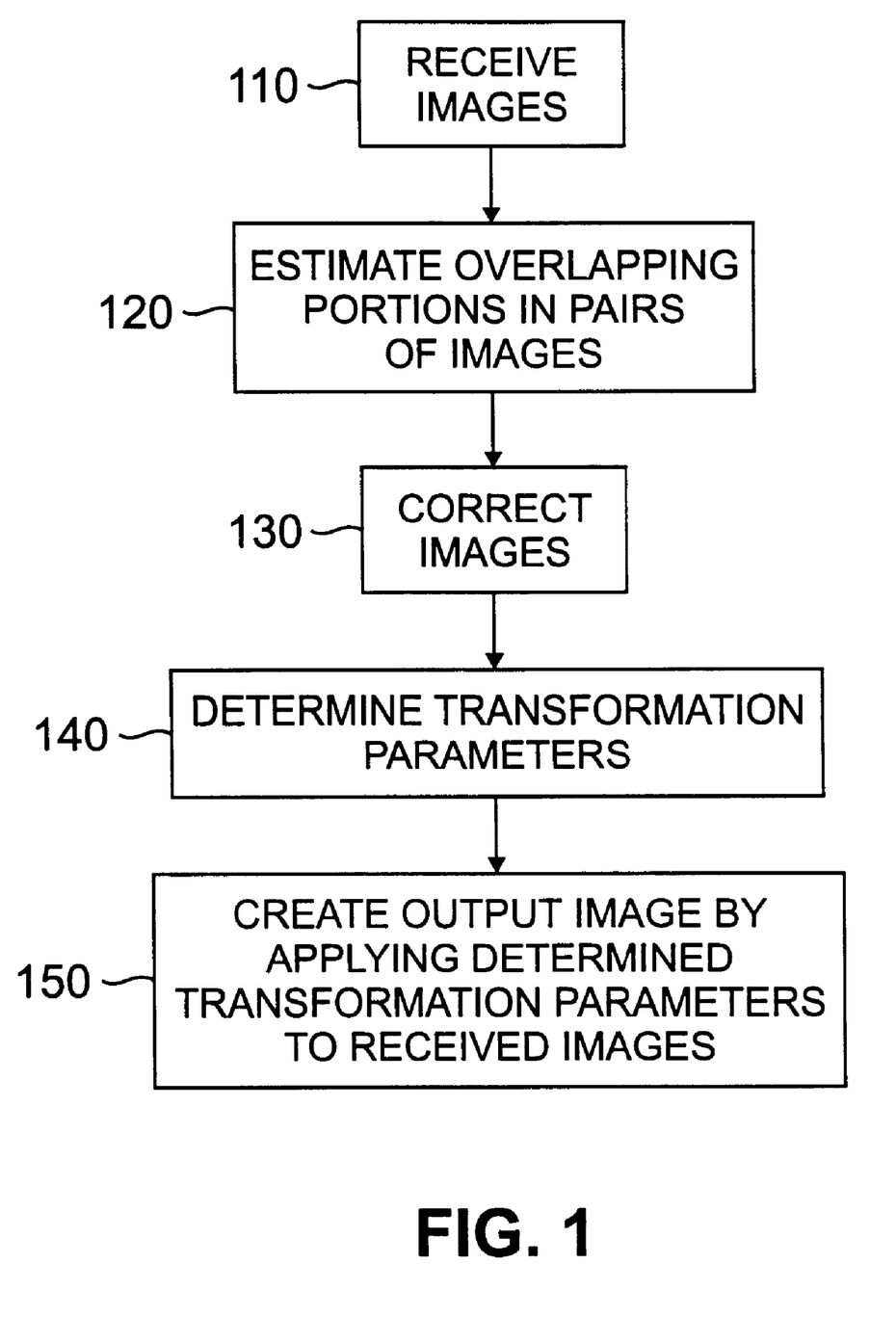
FIG. 1 illustrates a flow diagram for combining images.

Referring to FIG. 1, source images to be combined in an output image are accessed in a computer system (step 110). The source images are digital images, which may be, for example, digitized photographs or computer generated images.

Figure 2:
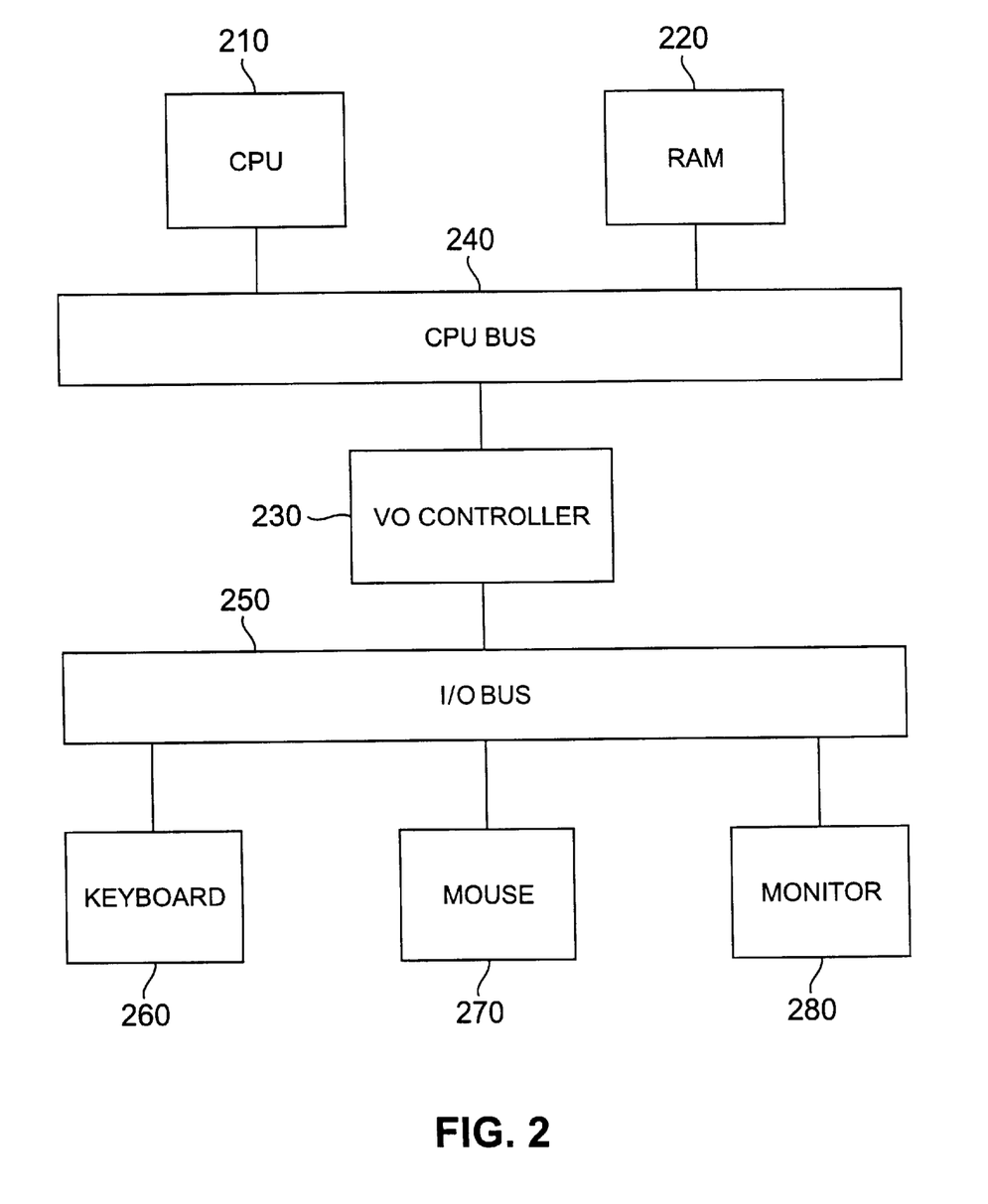
FIG. 2 illustrates a computer system.

The computer system may include special purpose hardware, a general purpose computer running application software, or a combination of both. Preferably, the invention is implemented in a computer program executing in a general purpose computer. FIG. 2 illustrates an appropriate computer system 200, including a CPU 210, a RAM 220, and an I/O controller 230, coupled by a CPU bus 240. The I/O controller 230 is also coupled by an I/O bus 250 to input devices such as a keyboard 260 and a mouse 270, and output devices such as a monitor 280.

A pixel of a digital image generally includes data describing its color. Pixel data from the source images are eventually combined to create pixel data for the output image. Pixel data of monochrome images are single channel, having a single value indicating a degree of intensity. Pixel data of color images typically have multiple channels, having a value for each channel with the pixel color indicated by the combination of the channel values. For example, in the RGB (red-green-blue) color system, color data for a pixel will include a value for each of the red channel, the green channel, and the blue channel. To simplify computations involving color data, multichannel color data may be converted to a single value. Various conversion methods may be used. For example, the single value may be based on the value of the green channel, the average of the values of the color channels, or another combination of the values of the color channels. For example, as explained in FOLEY ET AL., COMPUTER GRAPHICS: PRINCIPLES AND PRACTICE 589 (Addison-Wesley 2d ed. 1996), "luminance" is a color characteristic derived from a weighted sum of the color channels, 0.30*R+0.59*G+0.11*B.

To be combined, each of the source images must contain a scene that overlaps with the scene of at least one of the other source images. The amount of overlap needed may vary depending on factors such as the content of the images, temporal scene changes, temporal camera parameter changes (for example, different focus, exposure, or point of view), and camera fidelity (for example, distortion and compression artifacts). In general, the greater the overlap, the more accurate the output image will be. For example, while an output image can be created from source images having as little as 20% overlap, source images having closer to 50% overlap are likely to result in a more accurate output image.

The present invention further assumes that each of the source images to be combined is taken from approximately the same camera location, although factors such as rotation, focus, exposure and zoom may vary.

2. Finding Overlapping Areas in Source Images

Referring again to FIG. 1, the overlapping areas between pairs of source images are estimated (step 120). If the images received in step 110 have no available information about which images overlap, each pair of images is tested to determine overlapping areas. Alternatively, user-guided indication of overlap may be provided to simplify this process.

Figure 3:
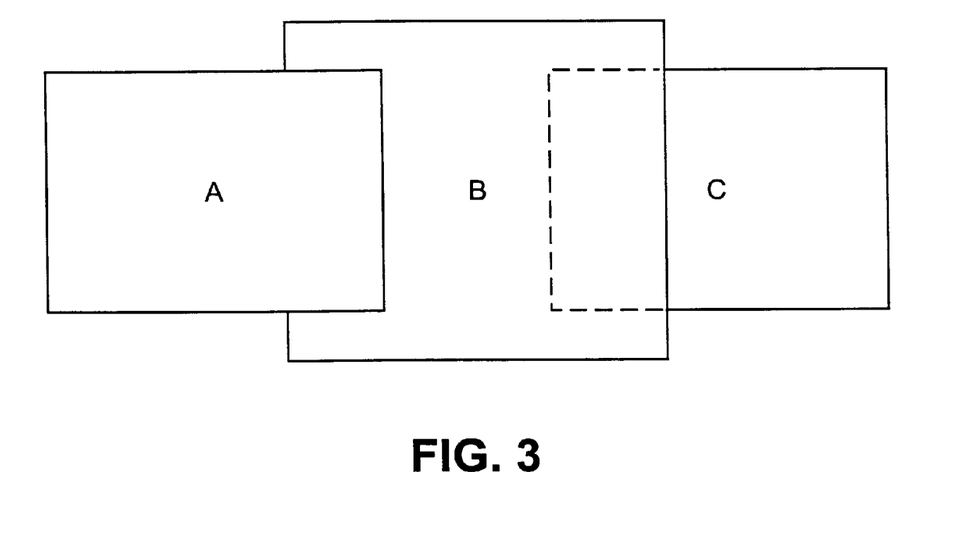
FIGS. 3 and 4 illustrate images to be combined.
Figure 4:
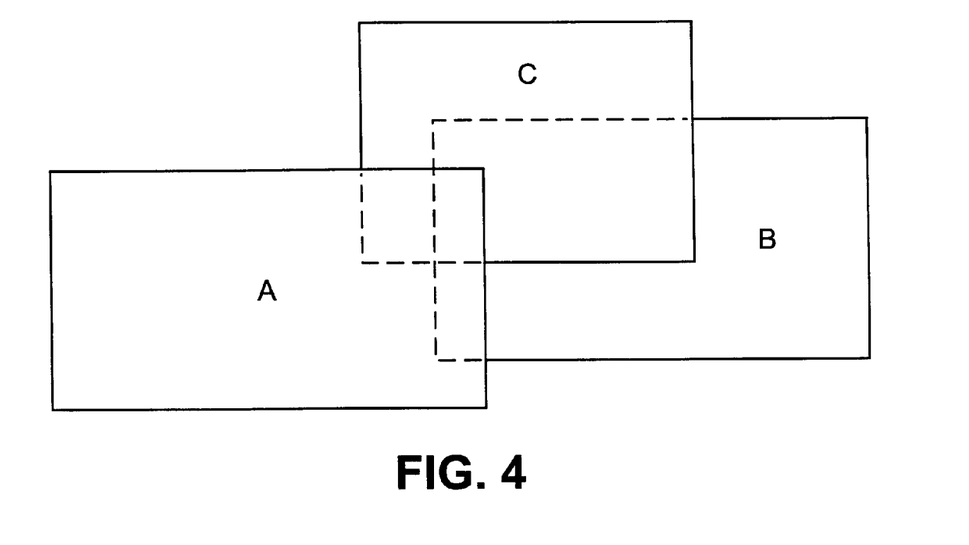

For example, the pairs containing overlapping areas may be reflected in the order in which they are entered. Thus, if the set of images can be arranged as a single unbranching chain or as a single loop as shown in FIG. 3, the invention can be implemented to require images to be input such that sequentially input images overlap. Overlap for source images having more complex overlap relationships, as shown in FIG. 4, can be specified by having the user manually enter overlap information. For example, a user interface may be provided to prompt the user to type the information or to display a graphical user interface allowing the user to graphically indicate overlapping images. Automatic and user-aided detection of overlap may be used in combination, and user input may be used to identify the overlapping area in an image pair, in addition to identifying the images that overlap.

One possible overlap estimation method is cross-correlation between the images. The cross-correlation function $$C(i, j) = \sum_m \sum_n I_0(i-m, j-n) I_1(i, j) \qquad \text{Equation 2}$$

where $I_0(i,j)$ and $I_1(i,j)$ are the image intensities, between two translated versions of the same image will tend to have a maximum at values for m and n indicating the best translation. This formulation shows computation of the cross-correlation in the spatial domain. The function may also be computed using the frequency domain:

$$C(i,j) = \Im^{-1}(\Im(I_0(i,j))\Im^*(I_1(i,j))) \qquad \text{Equation 3}$$

where $\Im$ is the discrete Fourier transform, $\Im^*$ is the complex conjugate of the discrete Fourier transform, and $\Im^{-1}$ is the inverse discrete Fourier transform. The advantage of using the frequency domain to compute the cross-correlation is that a fast Fourier transform algorithm can be used to perform the operation more efficiently.

When the frequency domain is used, a variant of regular correlation called phase correlation can be performed instead. In this variant, the Fourier transform of each image is normalized so that each complex value in the transform has unit magnitude (this is also equivalent to normalizing after multiplying the transform and the transform conjugate). The advantage of phase correlation over regular correlation is that the windowing effects, which occur because the images are of finite size, are reduced. Further detail on phase correlation may be found in the 1996 article by Xin Tong and Krishna Nayak, Image Registration Using Phase Correlation (available at URL http://www-leland.stanford.edu/~xin/ee262/report/report.html).

The phase correlation procedure takes the discrete Fourier transform of both images using an FFT (fast Fourier transform), multiplies the transforms element by element (taking the conjugate of the second before multiplication), computes the pure phase by normalizing each complex value to a magnitude of one, and takes the inverse Fourier transform. The estimate of the best translation to use for overlap is then determined by scanning the result for the location of the maximum magnitude value.

An alternative to using an input image directly in correlation is to use a level from an image pyramid, such as a Laplacian pyramid described in articles such as Burt & Adelson, The Laplacian Pyramid as a Compact Image Code, IEEE Transactions on Communications 31:532–40 (1983). Briefly, known algorithms may be used to construct Laplacian pyramids from source images, where levels of varying resolution encode the source image content at varying spatial frequencies. Typically, a sample of the lowest resolution level is based on the average of the image data of the region in the source image corresponding to that sample. A sample of the next resolution level is based on the difference between the data of the corresponding sample of the lower resolution level and the average of the data of the corresponding region in the source image.

One method of creating a Laplacian pyramid is to increase the number of levels incrementally. A pyramid is initialized by making the image itself a level. This is a valid single-level pyramid. The number of levels is incremented by convolving the current lowest resolution level with an averaging filter to form a moving-average image, replacing the current lowest resolution level with the current lowest resolution level minus the moving-average (pixel by pixel), and creating the new lowest resolution level by subsampling the moving-average. This process is repeated to create as many levels as desired in the pyramid.

Correlation (including phase correlation) to find an estimate of image overlap can be based on corresponding Laplacian pyramid levels of the input images instead of being based directly on the input images themselves. One advantage of using the pyramid data is that performing correlation over the lower resolution pyramid data is faster than over the full resolution image data. Another advantage is that the original image data generally gives more weight (importance) to the brighter areas than to the darker areas, which is not desirable. In contrast, because the Laplacian levels other than the lowest resolution level are signed images with approximately zero mean values, the bright areas in the original input images are not given more weight than darker areas, thus avoiding the need for normalization that would otherwise be required. A discussion of using Laplacian pyramids for image correlation may be found in Hansen et al., Real-time Scene Stabilization and Mosaic Construction, 1994 IMAGE UNDERSTANDING WORKSHOP (1994).

3. Source Image Correction

Referring again to FIG. 1, the source images are prepared for combination by correcting the images so that the overlapping portions of source images are more closely matched (step 130), which in turn can produce a more accurate output image. The specific correction operations may vary for different applications, and if desired, some may be performed prior to determining the overlapping areas of the images (step 120), which may remove distortions that will allow the overlapping areas to be more easily identified. On the other hand, if the overlapping portions are determined first (step 120), the minimizing operations (step 130) may be restricted to the overlapping portions rather than being performed on entire images to reduce the amount of required computation.

An example of a correction operation corrects nonuniform magnification produced in an image by the lens. The resulting image distortion is typically radial lens distortion, which changes the magnification in the image based on the distance from the center of projection. (The center of projection is the point in the image that matches where the optical axis of the lens intersects the image plane.) Magnification that decreases with distance is called barrel distortion; magnification that increases with distance is called pincushion distortion. Radial distortion can be modeled with a simple polynomial, as described in articles such as R. Y. Tsai, An Efficient and Accurate Camera Calibration Technique, PROCEEDINGS IEEE COMPUTER VISION AND PATTERN RECOGNITION 364–74 (1986), and can be removed by resampling based on the polynomial model.

Another example of a correction operation corrects non-uniform scaling caused by perspective projections, causing objects near the edges of the image to appear larger than the same objects would appear near the center. This effect is increased as the field of view widens. In these cases, it may be helpful to reproject one or both images before doing correlation, normalizing the scaling in an area of proposed overlap.

Reprojection can be time-consuming, but it can be performed automatically without user interaction. If performed prior to correlation (step 120), the overlapping areas may be easier to identify. However, correlation (step 120) generally works acceptably well without reprojection, which is an optional operation.

A special case of this technique is to reproject into cylindrical coordinates, which normalizes the scaling across the entire images if the cylindrical axis is vertical and the motion is purely pan, or if the cylindrical axis is horizontal and the motion is purely tilt. This is appropriate when the camera orientation is known to have those restrictions.

Another correction operation normalizes the brightness in the source images to be combined. Source images may differ in brightness level. This may result, for example, if images are captured with autoexposure camera settings. One simple approach to normalize the brightness determines the average color data for pixels of the overlapping region in a source image and normalizes the color data values $A_{ij}$ for each pixel (I, j) in that region to the calculated average, $$A_{ij}^* = \frac{A_{ij}}{\overline{A}}.$$

A more sophisticated procedure may use a model that accounts for nonlinearities in mapping brightness to data values, and for differences resulting from different device types (for example, CCD and film) used in acquiring the source images, as well as differences among devices of the same type.

Another correction operation addresses varying focus of source images. If the overlapping portion is in focus in one image and out of focus in the other, blurring tends to bring them closer to matching. One way to minimize the variation in focus in source images to be combined is by blurring the source images slightly with a filter to reduce high-frequency noise, producing the effect of putting all source images slightly out of focus.

Yet another possible correction operation may correct for vignetting, an effect describing the variation in the amount of light gathered as the incident direction moves off the optical axis. This effect, explained in articles such as Just what is a Good Lens Anyway?, which is found at http://web.ait.ac.nz/homepages/staff/rvink/optics.html, is a darkening of the corners and edges of the image relative to the center. Correction involves modeling the vignetting function and multiplying by its reciprocal across the image.

4. Determining Transformation Parameters

Referring to FIG. 1, transformation parameters are determined from each source image to a target image (step 140). For example, if images A and B contain overlapping scenes, image B may be the target image where the transformation parameters map pixels of image A into the image space of image B.

The Mann & Picard article discusses derivation of two-dimensional transformation parameters. Alternatively, three-dimensional transformation parameters may be derived. As described above, an image has corresponding three-dimensional camera parameters defining a camera position from which a scene appears as shown in the image. An ideal camera projects the scene before it onto a plane. Defining the camera in a local coordinate system such that it points along the z-axis, the projection onto the plane $z=z_0$ is:

$$[wu \ wv \ wz_0 \ w] = [x \ y \ z^* \ 1] \begin{bmatrix} 1 & 0 & 0 & 0 \\ 0 & 1 & 0 & 0 \\ 0 & 0 & 1 & \frac{1}{z_0} \\ 0 & 0 & 0 & 0 \end{bmatrix} \quad \text{Equation 4}$$

where (u, v) are coordinates defined in the plane defined by $z=z_0$, (x, y, z*) are corresponding coordinates defined in 3-space, and w is the homogeneous variable. We can express the points in 3-space in terms of their image space coordinates (u,v):

$$[wu \ wv \ wz_0 \ w] = \left[ \frac{u}{z} \ \frac{v}{z} \ \frac{z_0}{z} \ 1 \right] \begin{bmatrix} 1 & 0 & 0 & 0 \\ 0 & 1 & 0 & 0 \\ 0 & 0 & 1 & \frac{1}{z_0} \\ 0 & 0 & 0 & 0 \end{bmatrix} \quad \text{Equation 5}$$

where $z = \frac{z_0}{z^*}$

Equations 4 and 5 assume that the images are captured from approximately the same camera location, and hold for both source and target images in their own local image spaces. The difference between the local image spaces can be expressed as a rotation:

$$[w_t u_t \ w_t v_t \ w_t z_t \ w_t] = \left[ \frac{u_s}{z} \ \frac{v_s}{z} \ \frac{z_s}{z} \ 1 \right] R \begin{bmatrix} 1 & 0 & 0 & 0 \\ 0 & 1 & 0 & 0 \\ 0 & 0 & 1 & \frac{1}{z_t} \\ 0 & 0 & 0 & 0 \end{bmatrix} \quad \text{Equation 6}$$

where ($u_t$, $v_t$) are the remapped image coordinates in the target image space, ($u_s$, $v_s$) are the image coordinates in the source image space, and z is the unknown depth of the point in the scene that is imaged at ($u_s$, $v_s$). This depth can be arbitrarily set to 1 because the results are invariant with respect to z. R is a rotation matrix that relates the local image spaces of the source and target images, and reprojects pixels of the source image into the image space of the target image.

The projection depth parameters $z_s$ and $z_t$ are related to the field of view of the imaging systems used to capture the source and destination images, respectively:

$$\alpha = 2\arctan\frac{v_{max} - v_{min}}{2z}$$

where $\alpha$ is the vertical field of view, $v_{max}-v_{min}$ is the vertical image extent, and z is the projection depth. The horizontal field of view may be calculated by replacing the vertical image extent with the horizontal image extent. The projection depth may be calculated from a known field of view with:

$$z = \frac{1}{2} \frac{v_{max} - v_{min}}{\tan\frac{\alpha}{2}}$$

Another interpretation of the projection depth is the lens focal length expressed in the same units as the image extent. Thus if the image extent is the physical size of the active area of the camera image plane, the projection depth is simply the focal length of the lens. If the image extent has been normalized, e.g. from −1 to 1, the corresponding projection depth can be derived from the lens focal length using the ratio of the normalized image extent to the size of the camera image plane active area.

The three-dimensional mapping may have as many as five degrees of freedom: up to three for rotation, one for $z_s$ (the depth of the source projection plane), and one for $z_t$ (the depth of the target projection plane). The rotation matrix R can be parameterized in a number of different ways. For example, using Euler angles, the matrix R may be factored into z (roll) ($\theta$), x (tilt) ($\psi$), and y (pan) ($\phi$) rotations:

$$R(\theta, \psi, \varphi) \cong \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \begin{bmatrix} 1 & 0 & 0 & 0 \\ 0 & \cos\psi & \sin\psi & 0 \\ 0 & -\sin\psi & \cos\psi & 0 \\ 0 & 0 & 0 & 1 \end{bmatrix} \begin{bmatrix} \cos\varphi & 0 & -\sin\varphi & 0 \\ 0 & 1 & 0 & 0 \\ \sin\varphi & 0 & \cos\varphi & 0 \\ 0 & 0 & 0 & 1 \end{bmatrix} \quad \text{Equation 7}$$

This parameterization reflects the ways camera motion is commonly constrained in creating images, such as pan only, pan and tilt only, or tilt only. Thus, for source images known to result from cameras having such constrained motions, corresponding camera parameters are readily determined and the degrees of freedom are decreased, simplifying the task of determining the three-dimensional transformation.

Figure 5:
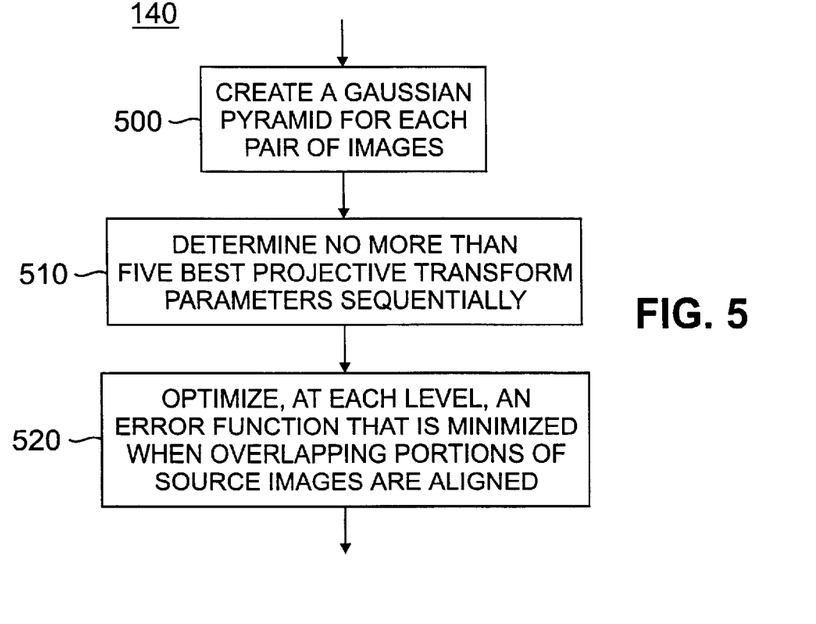
FIG. 5 illustrates a flow diagram for determining transformation parameters.

Referring to FIG. 5, a Gaussian pyramid is created for each of the pair of images (step 500). A Gaussian pyramid, like a Laplacian pyramid, is a multiresolution data set, and if desired, may be created only for the estimated overlapping areas of each image for a pair of images. Each level of a Gaussian pyramid is a smoothed and subsampled version of the next higher resolution layer.

The best parameters mapping the source image into the target image space such that the overlapping portions overlap are determined sequentially for increasing resolution levels of the Gaussian pyramids, using the parameters of the previous level as the initial estimate for the parameter values on the current level (step 510). If the source and target images are overlapping source images evaluated in step 120, an initial estimation of the three-dimensional transformation parameters between the lowest resolution levels of the images may be determined by converting the translation parameters found in the overlap estimation (step 120) into rotational parameters where:

$$\varphi_0 = \arctan\frac{u_{trans}}{z_0} \qquad \text{Equation 8}$$

$$\psi_0 = -\arctan\frac{v_{trans}}{z_0}$$

where ($u_{trans}$, $v_{trans}$) is the best image translation between the pair of images determined in step 120 and $z_0$ is the initial estimate for projection distance.

In general, a solution may be found at each level by optimizing an error function that is minimized when the overlapping portions of the source and the target images are aligned when the source image is remapped by the transformation parameters (step 520). One possible error function explained in the Szeliski article is the least squared difference between the intensity data of pixels of the overlapping portions in the remapped source image and the target image:

$$\chi^2 = \sum_{u_s,v_s} \frac{[A_t(u_t, v_t) - A_s(u_s, v_s)]^2}{\sigma^2} \qquad \text{Equation 9}$$

where $x^2$ is the error function, $A_s$ and $A_t$ are the source and target image intensity functions (interpolating between samples), ($u_s,v_s$) are the source image coordinates, and ($u_t,v_t$) are the resulting target image coordinates obtained by remapping the source image coordinates ($u_s$, $v_s$) using the estimated transformation parameters. ($\sigma^2$ is a weighting that may be set to 1, and will be omitted in subsequent equations.)

This optimization problem may be solved by methods such as gradient descent, inverting the Hessian matrix, or a combination method like Levenberg-Marquardt, which are discussed in greater detail in references such as PRESS ET AL., NUMERICAL RECIPES IN C 540–47 (Cambridge University Press, 1988). These solution methods require partial derivatives of the error metric with respect to the transformation parameters. For some parameter p, the partial is:

$$\frac{\partial}{\partial p}\chi^2 = 2\sum [A_t - A_s]\left[\frac{\partial A_t}{\partial u_t}\frac{\partial u_t}{\partial p} + \frac{\partial A_t}{\partial v_t}\frac{\partial v_t}{\partial p}\right] \qquad \text{Equation 10}$$

$$\frac{\partial A_t}{\partial u_t} \text{ and } \frac{\partial A_t}{\partial v_t}$$

are the spatial derivatives of the pixel values of the target image at positions defined by pixels remapped from the source image. However, estimated transformation parameters will typically not map a source image pixel exactly to a pixel location in the target image, so interpolation may be required both to determine the value at a target pixel and to compute the derivatives. Because interpolation in the target image is done a large number of times (at every mapped source image pixel for each iteration over each pyramid level), the least squared difference determination can be expensive.

An alternative to minimizing the square of the pixel value differences is optical flow, described in references such as HORN & SCHUNK, DETERMINING OPTICAL FLOW: ARTIFICIAL INTELLIGENCE (1981). Optical flow treats the source and target images as images of the same scene separated in time and assumes that although the scene moves with respect to the camera between the time of capturing the source image and the target image, the brightness values remain constant. Thus, expanding the equation $$A(u, v, t) = A(u+\Delta u, v+\Delta v, t+\Delta t)$$

as a Taylor series, canceling the zeroth order term A(u, v, t) from both sides, and omitting terms higher than linear yields the optical flow equation:

$$\frac{\partial A}{\partial u}\Delta u + \frac{\partial A}{\partial v}\Delta v + \frac{\partial A}{\partial t}\Delta t = 0 \qquad \text{Equation 11}$$

Treating the source image as reflecting the brightness at time t and the target image as reflecting the brightness at time t+1, the best transformation parameters are found when the following equation is minimized:

$$\chi^2 = \sum_{u_s,v_s} \frac{\left[\frac{\partial A_s}{\partial u_s}(u_t' - u_s) + \frac{\partial A_s}{\partial v_s}(v_t' - v_s) + (A_t - A_s)\right]^2}{\sigma^2} \qquad \text{Equation 12}$$

In this formulation, ($u_t'$, $v_t'$) is ($u_t$, $v_t$) projected back into the source image space using the inverse of the current approximation of the transform. While this approach contains the difference in position values of pixels ($A_t$-$A_s$) as a subterm and thus is more complex than the least squared difference, in practice this term generally can be approximated with a constant without affecting convergence. Thus, performance is improved because spatial derivatives are required only in the source image, where interpolation is not needed.

This formulation takes the partial derivatives of the error metric with respect to the transformation parameters. The major component of these partials is $$\frac{\partial u_t}{\partial p} \text{ and } \frac{\partial v_t}{\partial p},$$

where p is a transformation parameter. One way to compute these values is to precompute derivative matrices before looping over the pixels of the source image to calculate the error metric. The transformation is:

$$[w_t u_t\ w_t v_t\ w_t z_t\ w_t] = [u_s\ v_s\ 0\ 1]T(z_s)R(\theta,\psi,\phi)P(z_t) \qquad \text{Equation 13}$$

where the source projection plane has been moved into a translation matrix T, R is the rotation, and P is the target projection. (This equation corresponds to Equation 6 above, where z=1, $z_s$ is reflected in matrix T, and matrix P represents the projection matrix.)

Taking a partial derivative of this function is a straightforward calculation. For example, the derivative with respect to $\theta$ is:

$$\left[\frac{\partial}{\partial\theta}w_t u_t\ \frac{\partial}{\partial\theta}w_t v_t\ \frac{\partial}{\partial\theta}w_t z_t\ \frac{\partial w_t}{\partial\theta}\right] = \qquad \text{Equation 14}$$

$$[u_s\ v_s\ 0\ 1]\ T(z_s)\frac{\partial R(\theta, \psi, \varphi)}{\partial\theta}P(z_t)$$

Thus, the derivative matrix with respect to $$\theta \text{ is } T(z_s)\frac{\partial R(\theta, \psi, \varphi)}{\partial\theta}P(z_t).$$

This can be computed and saved, along with the derivative matrices for the other parameters at the beginning of each iteration. Then, the product of each source image pixel ($u_s,v_s$) and the derivative matrix is calculated. To compute $\frac{\partial}{\partial \theta} u_t$ from $\frac{\partial}{\partial \theta} w_t v_t$ and $\frac{\partial w_t}{\partial \theta}$, and similarly compute $\partial \frac{\partial}{\partial \theta} v_t$ from $\frac{\partial}{\partial \theta} w_t v_t$ and $\frac{\partial w_t}{\partial \theta}$, we use the rules for the derivative of a quotient:

$$\frac{\partial}{\partial \theta} u_t = \frac{\partial}{\partial \theta}\left(\frac{w_t u_t}{w_t}\right) = \frac{w_t \frac{\partial(w_t u_t)}{\partial \theta} - w_t u_t \frac{\partial w_t}{\partial \theta}}{w_t^2}$$ Equation 15

$$\frac{\partial}{\partial \theta} v_t = \frac{\partial}{\partial \theta}\left(\frac{w_t v_t}{w_t}\right) = \frac{w_t \frac{\partial(w_t v_t)}{\partial \theta} - w_t v_t \frac{\partial w_t}{\partial \theta}}{w_t^2}$$

Computing the derivative matrix with respect to any of the five parameters independently is similar. There is a useful special case when $z_s$ and $z_t$ are allowed to vary but are constrained to be equal. This occurs when both source and target images are known to be based on photographs taken with the same camera position and lens settings. The derivative matrix for this combined parameter is (using the product rule):

$$\frac{\partial T(z)}{\partial z} R(\theta, \psi, \varphi) P(z) + T(z) R(\theta, \psi, \varphi) \frac{\partial P(z)}{\partial z}$$ Equation 16

At each pyramid level, the transformation parameters are determined using an iterative optimization method such as those described in Press' NUMERICAL RECIPES IN C, which conclude when a termination condition is met. For example, a termination condition may be met if little or no progress is being made in decreasing $x^2$ in subsequent iterations, or if a predetermined limit of time or number of iterations is exceeded. The solution at each layer is used as the initial estimate for the solution at the next higher resolution layer until the solution is found for the highest resolution layer of the pyramids. The value of $x^2$ between the images is tracked as the method proceeds, and the covariance matrix of the parameters is available from the singular value decomposition.

5. Output Rendering

Figure 6:
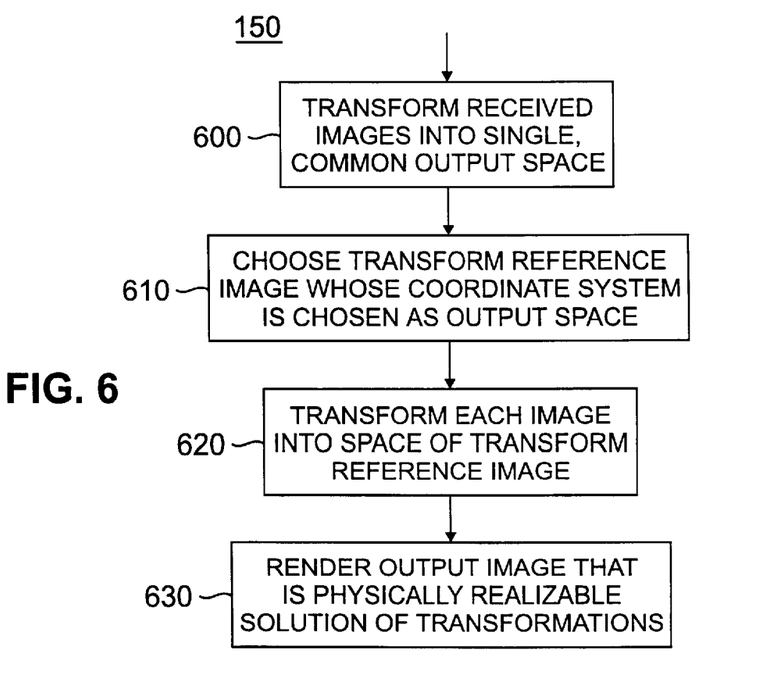
FIGS. 6–8 illustrate flow diagrams for output rendering of source images.

Referring to FIG. 1, once transformation parameters are determined for the pairs of overlapping source images, the image data from the source images can be reprojected onto an output plane to form the output image (step 150). Referring also to FIG. 6, a prerequisite to the rendering of the output image is to transform all input images (which have, to this point, been related only to one other by a set of pairwise transformations) into a single, common output space (step 600). A image may be arbitrarily chosen as a "transform reference image", whose coordinate system is chosen as the output space for this part of the process (step 610). Each other image will be positioned relative to this image, that is, each other image is transformed to the space of the transform reference image (step 620). Once the other images are transformed, the output image is rendered based on the physically realizable solution of the transformation (step 630).

Figure 7:
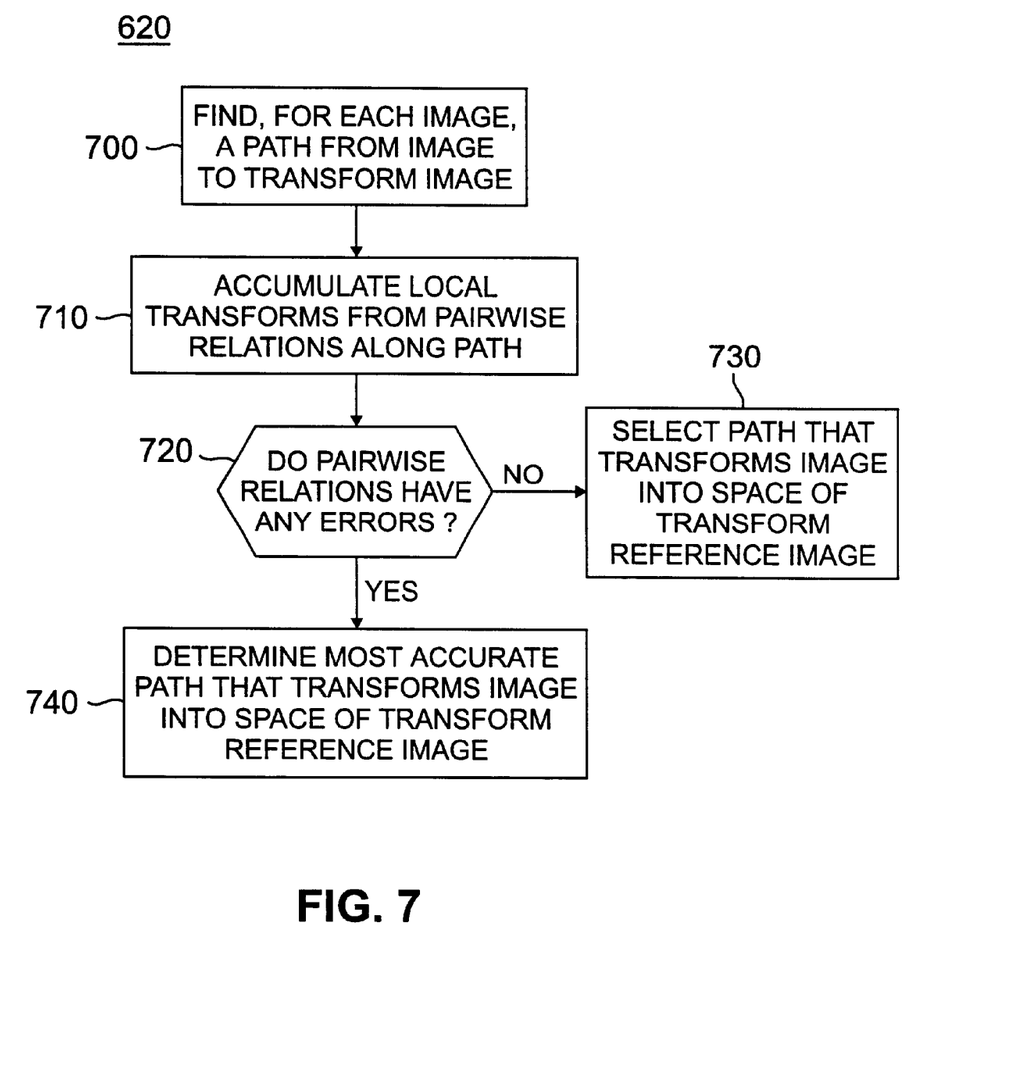

Referring to FIG. 7, choosing a relative transform for each image to the transform reference image is a process of finding a path via the pairwise relations from the image to the transform reference image (step 700). Local transforms from the pairwise relations are accumulated (with matrix multiplication) along the path to produce the complete transform to the space of the transform reference image (step 710). A given image can frequently be transformed into the space of the transform reference image through several pathways.

Referring to FIG. 4, each of images A, B, and C overlap, so there are pairwise relations between A and B, A and C, and B and C. If A is chosen to be the transform reference image, the transform of B into the output space may be determined using either the single path B to A, or with the composite path B to C then C to A.

If the all the pairwise transforms contain no error, then different paths between two images should yield the same output space transformation (step 720). In the presence of error, however, some paths may be better than others. Rather than selecting between multiple paths arbitrarily (step 730), it is helpful to try to determine which path is likely to be the most accurate (step 740).

Figure 8:
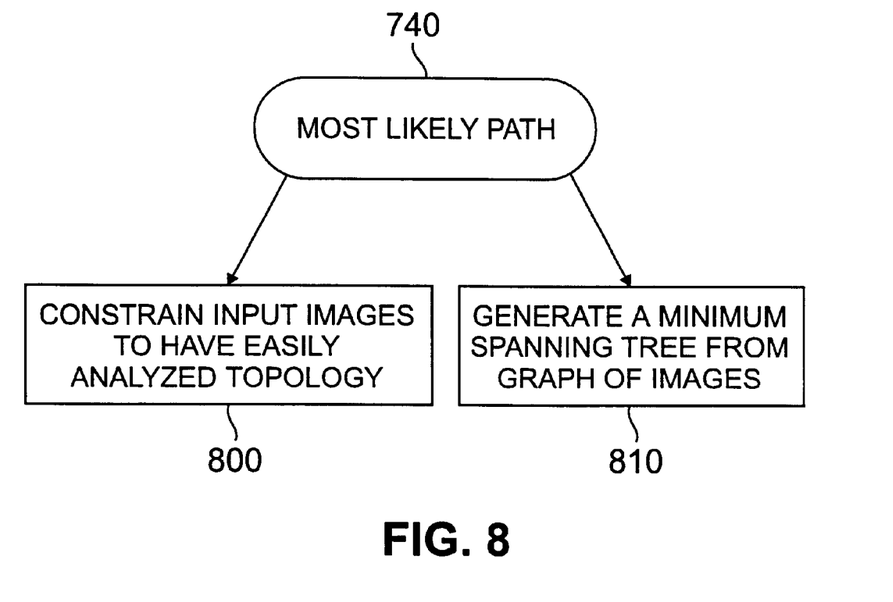

Referring to FIG. 8, a simple way to do this is to constrain the input images to have some easily analyzed topology (block 800). For example, if all the images overlap sequentially in the order of input, the pairwise relations between adjacent images can be used.

Another technique that does not depend on prior knowledge of the topology is based on the generation of a minimum spanning tree from the graph of images, where the cost of each link is the negative of some confidence metric of that link (block 810). A minimum spanning tree is defined on a connected graph where each edge has a specified cost, and is the acyclic connected subset graph that has the lower cost sum. A discussion and algorithm for generating the minimum spanning tree is in SEDGEWICK, ALGORITHMS, pp. 452–61 (2d ed. 1988). The process removes pairwise relations so that there is exactly one path between any two images. Furthermore, the sum of the confidence metrics of the remaining pairwise relations is at least as high as any other spanning tree.

One confidence metric used is the number of pixels of overlap between each pair of images. Other confidence metrics can be employed including those based on the result of the projective fit.

If all overlap relations are specified, running the minimum spanning tree algorithm eliminates paths that have less aggregate overlap and are thus less likely to generate an accurate result.

Figure 9:
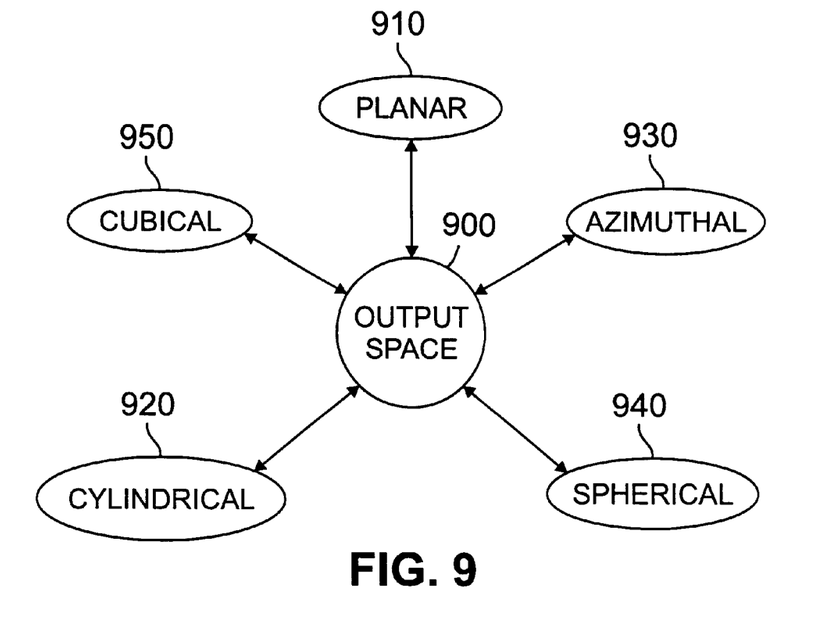
FIG. 9 illustrates a block diagram of possible output spaces to which source images are reprojected.

Referring to FIG. 9, image data reprojection onto an output space 900 is not limited to reprojection onto output planes 910, which are theoretically limited to containing less than a 180 degree field of view and are practically limited to about 120 degrees to avoid objectionable perspective effects. Other projections, such as into cylindrical 920 or azimuthal 930 coordinates, introduce distortion but can effectively display fields of view approaching or exceeding 180 degrees. The entire gamut of map projections, which are normally used to display the outer surface of a sphere 940, can be used. Map projections are described in greater detail in articles such as Peter H. Dana's article, Map Projection Overview, available at http://www.utexas.edu/depts/grg/gcraft/notes/mapproj/mapproj.html.

One possible reprojection is to project the output image onto the interior faces of a cube 950. An interactive panoramic viewer with no view direction constraints can be created by rendering a cube using those projections as texture maps. This viewing mechanism can be directly accelerated by using hardware designed for three-dimensional applications.

If the overlapping portions of image data in the source images match exactly (for example, in content, brightness, and color), any blending technique may be used to create image data for the output image in the overlapping portions. In general, however, the images will differ noticeably (even when camera and lens settings are identical), which suggests using a blending technique that increases the consistency between pixels of overlapping portions of the images, as well as in the surrounding portions. One such technique uses a weighted average of pixel data from source images as the pixel data for the output image, where the weight accorded to data from a pixel of a particular image is proportional to the distance of that pixel to the edge (in both dimensions) in that image.

Output rendering may be inverse or forward. Inverse rendering evaluates each source image to determine data for a pixel in the output image, determining which source images contribute to a specific output pixel, summing weighted pixel data from appropriate source images, normalizing to a unit weight, and storing the result, then moving to the next output pixel. Forward rendering evaluates each source image just once to determine data for the pixels of the output image by transforming data for each source image pixel and accumulating weighted data and the weights into buffers for the output image. After evaluating all source images, the weighted sums for the output image data are normalized to a unit weight.

If desired, the invention may interface with hardware or software capable of rendering textured polygons to accelerate the rendering process. Each image can be converted into a texture map, and a rectangle enclosing the image extent and transformed with the transformation parameters can be passed to the renderer.

6. Making Transformations Globally Consistent

As noted above, a potential problem in creating final renderings results from the fact that the above transformations are determined only on a pairwise basis. For example, the transformations between overlapping source images A, B, and C are supposed to be invertible ($M_{AB}=M_{BA}^{-1}$) and transitive ($M_{AB}M_{BC}=M_{AC}$) However, because the transformation parameters are typically not perfectly estimated, the invertible and transitive properties may not be satisfied. Often the relationship between two images can be determined through more than one path. For example, if image A overlaps image B, image B overlaps image C, and image A overlaps image C, as shown in FIG. 4, possible paths from A to C include $M_{AC}$ and $M_{AB}M_{BC}$. Selecting just one path can cause poor results when the relationship is not the most direct one. This is particularly evident when the image sequence forms a large loop, as it does when constructing fully circular views. The mapping error builds up between the successive combinations of images in the loop, often with the result that a visible mismatch exists between the last image and the first image.

It is possible to satisfy the invertible and transitive constraints by estimating all mappings simultaneously, but this is very expensive computationally. This would require constructing a composite error function of all pairwise relations, and solving over a large dimensional space (the number of degrees of freedom times the number of pairwise relations).

An alternative is to treat the transformation parameters computed on a local basis as being estimates for the global parameters. When a data set is fit to an analytic model using a chi-squared minimization, the Hessian matrix at the parameter values found by the fit is the inverse of the covariance matrix for the fitted parameters. (See PRESS ET AL., NUMERICAL METHODS IN C pp. 540–47.) The covariance matrix is a characterization of the distribution of the parameter estimate, and thus may be used directly to determine the likelihood that the actual parameter values are within some specified epsilon of the estimated values, assuming a multivariate normal distribution. Expressed slightly differently, the covariance matrix can be used as a measure of the relative confidence in the estimate of each parameter value.

The global parameters are derived by adjusting the estimates to satisfy the global constraints in a way that changes high confidence estimates less than low confidence estimates. Assuming that the distribution is the multivariate normal distribution, the probability distribution is proportional to:

$$P(p_i) \rightarrow e^{-\frac{1}{2}\sum_i (p_i - p_i')(C_i^{-1}(p_i - p_i'))^T}$$

(See PRESS ET AL., NUMERICAL METHODS IN C p. 554.) The global constraints may be satisfied by maximizing this probability, or equivalently (because the negative exponential is monotonically decreasing), by minimizing the term:

$$D(p_i) = \sum_i (p_i - p_i')(C_i^{-1}(p_i - p_i'))^T$$

where the sum is over the image pairs, $P_i$ is the unknown vector of mapping parameters for pair I, $P_i'$ is the locally computed estimate for the mapping parameters for pair I, and $C_i^{-1}$ is the inverse covariance matrix of the parameters for pair I. This second formulation may also be interpreted as minimizing the squared distance from the estimate measured in "units" of standard deviation. While this approach still results in a large dimensional space, it does not require the composite error function of all pairwise relations.

For a single loop of n images, we can compactly express the global constraint as the identity transform:

$$M_{1,2}M_{2,3}\ldots M_{n-1,n}M_{n-1}=I \qquad \text{Equation 17}$$

Additional constraint terms can be added for additional loops that exist in the source images.

Constrained optimization problems of this type can be solved using Lagrangian multipliers, setting the partial derivatives with respect to each parameter and $\lambda$ of the following expression to zero, and solving the resulting system of equations.

$$\sum_i (p_i - p_i')C_i^{-1}(p_i - p_i') + \lambda\|M_{1,2}M_{2,3}\ldots M_{n-1,n}M_{n,1} - I\|^2 \qquad \text{Equation 18}$$

Finding and rendering the images with those parameters distributes the error across all the image pairs.

Other embodiments are within the scope of the following claims.

What is claimed is:

1. A computer-implemented method for combining two-dimensional source images that have overlapping portions and are taken from a substantially common camera location, each source image represented by a corresponding digital data set of three-dimensional camera parameters that define a position of the camera relative to the source image that is viewed from the camera, the method comprising:

for each pair of overlapping source images to be combined:
  determining three-dimensional transformation parameters defining a mapping between a first image space corresponding to one of the source images' digital data set and a second image space corresponding to the other of the source images' digital data set, the mapping describing a reorienting of the camera from one of the source images to the other of the source images; and creating an output data set representing a two-dimensional output image by combining the digital data sets representing the pair of source images in accordance with the determined three-dimensional transformation parameters and by transforming the source images into a common output space by finding a path from a source image space to an output image space based on the determined three-dimensional transformation parameters;

in which finding a path includes choosing a path that is more accurate than other paths.

2. The method of claim 1, wherein the source images overlap by at least around 20%.

3. The method of claim 1, wherein the three-dimensional transformation parameters describe a camera orientation, distances between the camera and the source images, and a distance between the camera and the output image.

4. The method of claim 1 further comprising projecting the created data set into an output image space.

5. The method of claim 4 in which the output image space corresponds to one of the source image spaces.

6. The method of claim 4 in which the output image space corresponds to a space different from the source image spaces.

7. The method of claim 1 further comprising correcting one or more of the source images to improve matching of overlapping portions of the source images.

8. The method of claim 7 in which image correction comprises correcting for nonuniform magnification.

9. The method of claim 7 in which image correction comprises correcting for nonuniform scaling.

10. The method of claim 7 in which image correction comprises normalizing brightness.

11. The method of claim 7 in which image correction comprises varying a focus.

12. The method of claim 7 in which image correction comprises correcting for vignetting.

13. The method of claim 1 in which determining three-dimensional transformation parameters comprises creating a Gaussian pyramid for each pair of source images.

14. The method of claim 1 in which determining three-dimensional transformation parameters comprises performing non-linear optimization corresponding to an alignment of source images.

15. The method of claim 14 in which non-linear optimization comprises minimizing an error function.

16. The method of claim 1 in which the common output space comprises any of a planar, cylindrical, azimuthal, cubical, or spherical space.

17. The method of claim 1 in which transforming the source images into a common output space comprises selecting, from among a plurality of paths, a path from a source image space to an output image space based on the determined three-dimensional transformation parameters.

18. The method of claim 1 in which a determined three-dimensional transformation between first and second source image spaces and an output space comprises no more than five degrees of freedom.

19. The method of claim 1 in which the created output data set is constrained to be physically realizable.

20. A memory device storing computer readable instructions for aiding a computer to combine two-dimensional source images that have overlapping portions and are taken from a substantially common camera location, each source image represented by a corresponding set of digital data of three-dimensional camera parameters that define a position of the camera relative to the source image that is viewed from the camera, the memory device comprising instructions to perform the following operations:

for each pair of overlapping source images to be combined:

determine three-dimensional transformation parameters defining a mapping between a first image space corresponding to one of the source images' digital data set and a second image space corresponding to the other of the source images' digital data set, the mapping describing a reorienting of the camera from one of the source images to the other of the source images; and create an output data set representing a two-dimensional output image by combining the digital data sets representing the pair of source images in accordance with the determined three-dimensional transformation parameters and by transforming the source images into a common output space by finding a path from a source image space to an output image space based on the determined three-dimensional transformation parameters;

in which finding a path includes choosing a path that is more accurate than other paths.

21. An apparatus to combine two-dimensional source images that have overlapping portions and are taken from a substantially common camera location, the apparatus comprising:

a storage medium to store overlapping source images, each source image represented by a corresponding set of digital data of three-dimensional camera parameters that define a position of the camera relative to the source image that is viewed from the camera; and a processor operatively coupled to the storage medium and configured to perform the following operations:

for each pair of overlapping source images to be combined:

determine three-dimensional transformation parameters defining a mapping between a first image space corresponding to one of the source images' digital data set and a second image space corresponding to the other of the source images' digital data set, the mapping describing a reorienting of the camera from one of the source images to the other of the source images; and create an output data set representing a two-dimensional output image by combining the digital data sets representing the pair of source images in accordance with the determined three-dimensional transformation parameters and by transforming the source images into a common output space by finding a path from a source image space to an output image space based on the determined three-dimensional transformation parameters;

in which finding a path includes choosing a path that is more accurate than other paths.

22. A computer-implemented method for combining two-dimensional source images that have overlapping portions and are taken from a substantially common camera location, each source image represented by a corresponding digital data set of three-dimensional camera parameters that define a position of the camera relative to the source image that is viewed from the camera, the method comprising:

for each pair of overlapping source images to be combined:
  determining three-dimensional transformation parameters defining a mapping between a first image space corresponding to one of the source images' digital data set and a second image space corresponding to the other of the source images' digital data set, the mapping describing a reorienting of the camera from one of the source images to the other of the source images; and
  creating an output data set representing a two-dimensional output image by combining the digital data sets representing the pair of source images in accordance with the determined three-dimensional transformation parameters and by transforming the source images into a common output space by finding a path from a source image space to an output image space based on the determined three-dimensional transformation parameters;
  in which finding the path comprises constraining parameters of the source images.

23. A computer-implemented method for combining two-dimensional source images that have overlapping portions and are taken from a substantially common camera location, each source image represented by a corresponding digital data set of three-dimensional camera parameters that define a position of the camera relative to the source image that is viewed from the camera, the method comprising:
  for each pair of overlapping source images to be combined:
    determining three-dimensional transformation parameters defining a mapping between a first image space corresponding to one of the source images' digital data set and a second image space corresponding to the other of the source images' digital data set, the mapping describing a reorienting of the camera from one of the source images to the other of the source images; and
    creating an output data set representing a two-dimensional output image by combining the digital data sets representing the pair of source images in accordance with the determined three-dimensional transformation parameters and by transforming the source images into a common output space by finding a path from a source image space to an output image space based on the determined three-dimensional transformation parameters;
    in which finding the path comprises generating a minimum spanning tree.

\* \* \* \* \*